United States Patent
Jeong

(10) Patent No.: US 10,017,055 B2
(45) Date of Patent: Jul. 10, 2018

(54) METHOD FOR CONTROLLING AIR CONDITIONER BASED ON ENERGY FLOW MODE OF VEHICLE

(71) Applicants: Hyundai Motor Company, Seoul (KR); KIA MOTORS CORP., Seoul (KR)

(72) Inventor: Won Young Jeong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 584 days.

(21) Appl. No.: 14/305,889

(22) Filed: Jun. 16, 2014

(65) Prior Publication Data

US 2015/0107814 A1 Apr. 23, 2015

(30) Foreign Application Priority Data

Oct. 22, 2013 (KR) .................. 10-2013-0126225

(51) Int. Cl.
| | |
|---|---|
| G05B 13/00 | (2006.01) |
| B60L 1/12 | (2006.01) |
| B60H 1/00 | (2006.01) |
| B60L 1/00 | (2006.01) |
| B60L 1/02 | (2006.01) |

(52) U.S. Cl.
CPC ............ B60L 1/12 (2013.01); B60H 1/00764 (2013.01); B60L 1/003 (2013.01); B60L 1/02 (2013.01)

(58) Field of Classification Search
CPC .... G05B 13/02; G05B 13/0265; G05B 15/02; G05B 2219/2642; G06F 17/00
See application file for complete search history.

(56) References Cited

U.S. PATENT DOCUMENTS 5,507,153 A * 4/1996 Seto .................. B60H 1/00392
188/159
6,761,037 B2 * 7/2004 Tsuboi ................ B60H 1/0075
165/42

(Continued)

FOREIGN PATENT DOCUMENTS

| JP | 2000-078701 A | 3/2000 |
| JP | 2004-112997 A | 4/2004 |

(Continued)

OTHER PUBLICATIONS

Korean Office Action dated Sep. 11, 2014 issued in Korean Patent Application No. 10-2013-0126225.

(Continued)

*Primary Examiner* — Vincent Tran
(74) *Attorney, Agent, or Firm* — McDermott Will & Emery LLP

(57) ABSTRACT

A method of controlling an air conditioner includes determining whether or not a signal for operating the air conditioner is input to a controller. When it is determined that the signal for operating the air conditioner is input to the controller, determining whether or not conditions for variably controlling the air conditioner are satisfied. When it is determined that the conditions are satisfied, an energy flow mode is checked on the basis of an energy flow between a battery, a motor, an engine, and electric components. The air conditioner is controlled in a mode corresponding to the checked energy flow mode.

12 Claims, 6 Drawing Sheets

(56) References Cited

U.S. PATENT DOCUMENTS

| | | | | |
|---|---|---|---|---|
| 9,233,613 B2* | 1/2016 | Kusumi | ............... | H02J 7/045 |
| 2005/0161211 A1* | 7/2005 | Zeigler | ............ | B60H 1/00378 |
| | | | | 165/240 |
| 2011/0079023 A1* | 4/2011 | Goenka | ............... | B60H 1/004 |
| | | | | 62/3.3 |
| 2011/0307134 A1* | 12/2011 | Yoshimi | ............... | B60K 6/48 |
| | | | | 701/22 |
| 2012/0101676 A1* | 4/2012 | Ichioka | ............... | B60K 6/445 |
| | | | | 701/22 |
| 2013/0187446 A1* | 7/2013 | Ferrel | ................ | B60L 11/14 |
| | | | | 307/9.1 |
| 2013/0213631 A1* | 8/2013 | Ichishi | ............. | B60H 1/00021 |
| | | | | 165/202 |
| 2014/0066251 A1* | 3/2014 | Kawamoto | ......... | B60W 20/30 |
| | | | | 477/4 |
| 2016/0244051 A1* | 8/2016 | Ikeda | .................... | B60K 6/48 |

FOREIGN PATENT DOCUMENTS

| | | |
|---|---|---|
| JP | 2004-156581 A | 6/2004 |
| JP | 2008-150035 A | 7/2008 |
| KR | 10-0887883 B1 | 3/2009 |
| KR | 10-2012-0071088 A | 7/2012 |
| KR | 10-1225563 B1 | 1/2013 |

OTHER PUBLICATIONS

Korean Notice of Allowance issued in corresponding Korean Patent Application No. 10-2013-0126225, dated Feb. 10, 2015; 2 pages in Korean language.

* cited by examiner

[FIG.2]
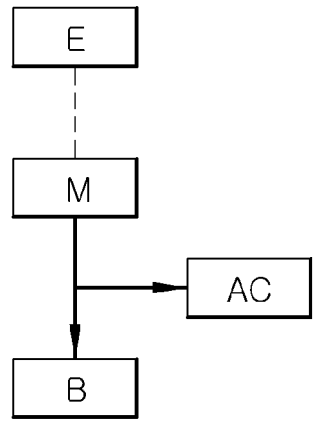
[FIG.3]
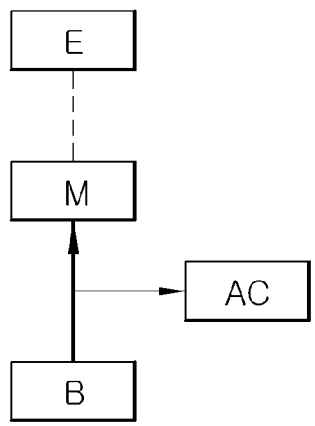

[FIG.4]
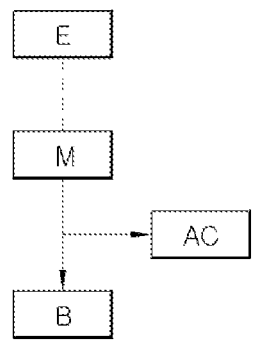
[FIG.5]
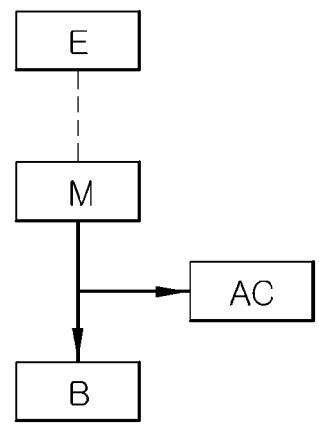

[FIG.6]
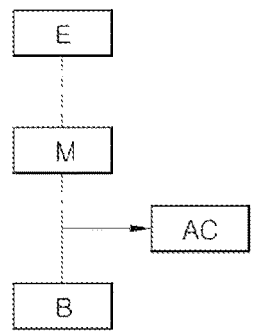
[FIG.7]
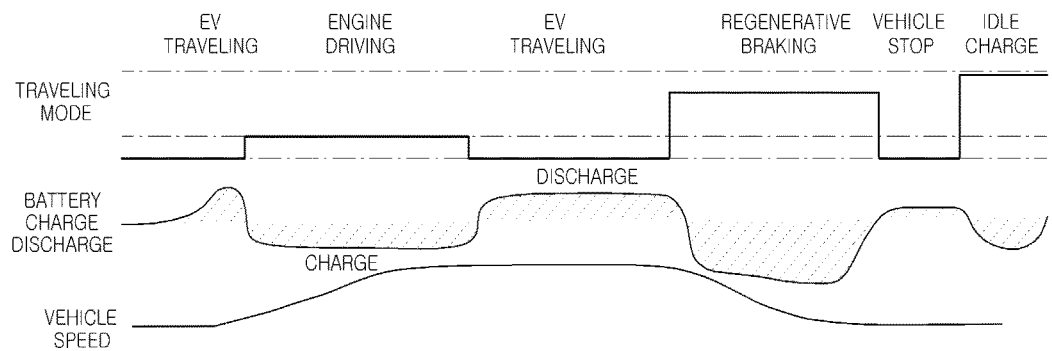

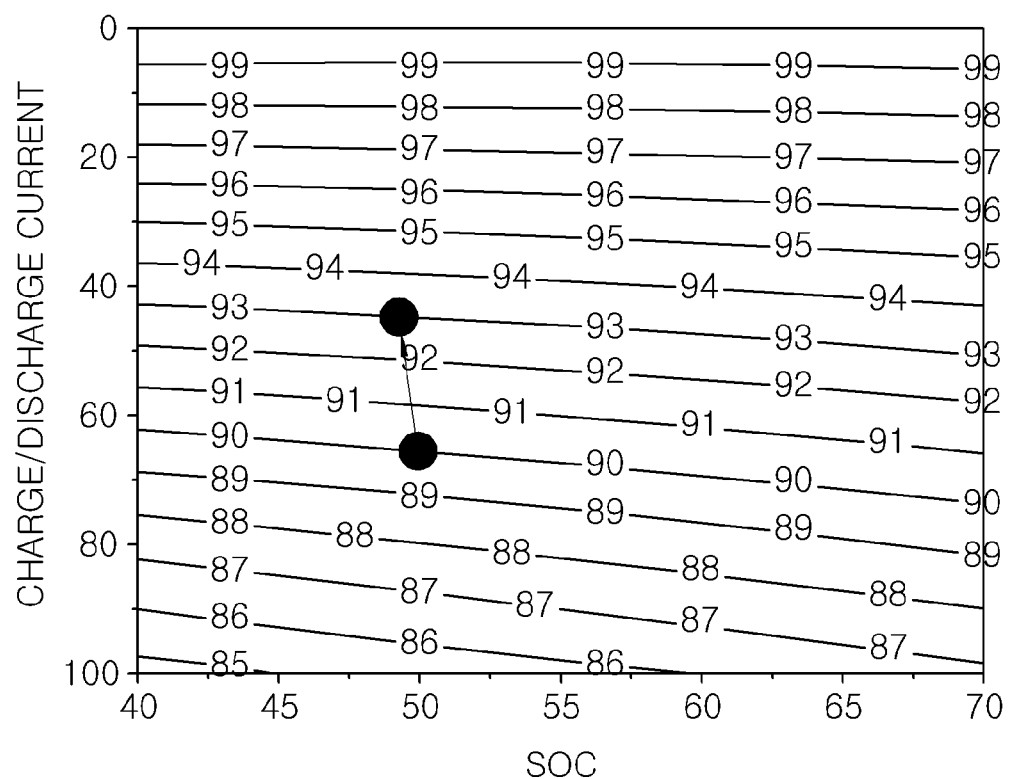
[FIG.8]

[FIG.9]

| CLASSIFICATION | | AC POWER CONSUMPTION | | | REMARKS |
|---|---|---|---|---|---|
| | | BATTERY DISCHARGE | BATTERY CHARGE | VEHICLE STOP | |
| SETTING CRITERION | | DISCHARGE 10A OR MORE | CHARGE 10A OR MORE | VEHICLE SPEED = 0 | |
| CHARGE/ DISCHARGE CURRENT (A) | BEFORE CHANGE | 10~30 | 40~60 | 11 | DISCHARGE CURRENT : Δ1.0A |
| | AFTER CHANGE | 9~29 | 38.7~58.7 | | CHARGE CURRENT : Δ1.3A |
| CHARGE/DISCHARGE Δ EFFICIENCY(%) | | 0.07~0.12 | 0.14 | | |
| EXPECTED FUEL EFFICIENCY | SOC | 0.12%↑ (≈6.18 KJ) | | | |
| | FUEL EFFICIENCY | 0.17%˙ | | | |

METHOD FOR CONTROLLING AIR CONDITIONER BASED ON ENERGY FLOW MODE OF VEHICLE

CROSS-REFERENCE(S) TO RELATED APPLICATION

The present application claims the benefit of priority to Korean Patent Application Number 10-2013-0126225 filed on Oct. 22, 2013, the entire contents of which is incorporated herein for all purposes by this reference.

TECHNICAL FIELD

The present disclosure relates to a method of controlling an air conditioner capable of variably controlling the air conditioner depending on an energy flow mode of a vehicle.

BACKGROUND

In hybrid vehicles, an air conditioner is operated by the engine or by an electric motor when an engine is not driven. Currently, a constant load is applied to the air conditioner regardless of a traveling condition of the vehicle.

In Japanese Patent Application No. 2000-078701, "air conditioner for an electric vehicle," an operating signal S output from an on-vehicle charger and a pre-air conditioning switch determines whether or not the on-vehicle charger is being charged, and how much power the on-vehicle charger is charged. When the on-vehicle charger is being charged and pre-air conditioning is selected, the pre-air conditioning is conducted (steps 120 to 124). Then, the amount of the on-vehicle charger power is determined, and air conditioning capacity, which is preset by the level charger power, is selected (steps 126 to 134). It is thus possible to conduct the pre-air conditioning without consuming battery power even if the charged power is relatively small. However, controlling the pre-air conditioning is complicated because the pre-air conditioning is conducted only according to a battery state. Therefore, there is a need for a method of controlling an air conditioner more efficiently in consideration of the charge efficiency of a battery.

The foregoing is intended merely to aid in the understanding of the background of the present disclosure and is not intended to mean that the present disclosure falls within the purview of the related art that is already known to those skilled in the art.

SUMMARY

The present disclosure has been made keeping in mind the above problems occurring in the related art, and the present disclosure is intended to propose a method of controlling an air conditioner, which can efficiently control the air conditioner in consideration of charge efficiency of a battery.

According to an exemplary embodiment of the present disclosure, a method of controlling an air conditioner includes determining whether or not a signal for operating the air conditioner is input to a controller. When it is determined that the signal for operating the air conditioner is input to the controller, determining whether or not conditions for variably controlling the air conditioner are satisfied. When it is determined that the conditions are satisfied, checking an energy flow mode on the basis of an energy flow between a battery, a motor, an engine, and electric components. The air conditioner is operated according to the checked energy flow mode. The electric components may be an air conditioner, lamp, and the like as used in a vehicle.

The method may further include controlling the air conditioner in a general control mode when it is determined that the signal for operating the air conditioner is not input to the controller.

The step of determining whether or not the conditions for variably controlling the air conditioner are satisfied may include determining whether or not a condition of an air conditioner controller of a vehicle corresponds to a previous condition input to the controller.

The step of determining whether or not the conditions for variably controlling the air conditioner are satisfied may further include determining whether or not an indoor temperature condition of a vehicle corresponds to the previous condition input to the controller on the basis of collected indoor information.

The step of determining whether or not the conditions for variably controlling the air conditioner are satisfied may further include determining whether or not an outdoor temperature condition of a vehicle corresponds to the condition previously input to the controller on the basis of collected outdoor information.

The step of determining whether or not the conditions for variably controlling the air conditioner are satisfied may further include determining whether or not revolutions per minute (RPM) of a compressor of the air conditioner correspond to a previous condition input to the controller.

The step of determining whether or not the conditions for variably controlling the air conditioner are satisfied may further include whether or not a condition of an air conditioner controller, an indoor temperature condition, an outdoor temperature condition, and revolutions per minute (RPM) of a compressor of the air conditioner correspond to previous conditions input to the controller, and when all the conditions are met, the step of checking the energy flow mode may be performed.

The step of checking the energy flow mode may include determining whether or not the energy flow mode is a regenerative braking mode and, when the energy flow mode is the regenerative braking mode, the air conditioner is controlled in a method corresponding to a previous regenerative braking mode input to the controller.

The step of checking the energy flow mode may include determining whether or not the energy flow mode is an electric vehicle (EV) traveling mode and, when the energy flow mode is the EV traveling mode, the air conditioner is controlled in a method corresponding to the EV traveling mode previously input to the controller.

The step of checking the energy flow mode may include determining whether or not the energy flow mode is a charge mode and, when the energy flow mode is the charge mode, the air conditioner is controlled in a method corresponding to a previous charge mode input to the controller.

The step of checking the energy flow mode may include determining whether or not the energy flow mode is an engine driving mode and, when the energy flow mode is the engine driving mode, the controlling of the air conditioner to be operated in a method corresponding to a previous engine driving mode input to the controller.

The step of checking the energy flow mode may include determining whether or not the energy flow mode is a regenerative braking mode, an electric vehicle (EV) traveling mode, a charge mode, or an engine driving mode. When the energy flow mode does not correspond to any one of the modes, the air conditioner is controlled in a method corresponding to a previous battery assist mode input to the controller.

According to a method of variably controlling the air conditioner as described above, even when the air conditioner dissipates energy, the entire efficiency of the system is increased because the charge/discharge efficiency of the battery is increased, so that fuel efficiency is improved.

Unlike the related art in which the air conditioner dissipates the same energy, power of the air conditioner is variably controlled according to an energy flow mode of the vehicle, so that it is possible to improve the fuel efficiency with respect to a charge/discharge gain of the battery.

BRIEF DESCRIPTION OF THE DRAWINGS

The above and other objects, features and other advantages of the present disclosure will be more clearly understood from the following detailed description when taken in conjunction with the accompanying drawings.

FIG. 2 shows a regenerative braking mode for controlling the air conditioner.

FIG. 3 shows an electric vehicle (EV) traveling mode or a battery assist mode for controlling the air conditioner.

FIG. 4 shows an idle charge mode for controlling the air conditioner.

FIG. 5 shows an engine driving mode for controlling the air conditioner.

FIG. 6 shows a stop mode for controlling the air conditioner.

FIG. 7 shows a charged/discharged state of a battery according to each traveling mode.

FIG. 8 shows charge/discharge efficiency of the battery.

FIG. 9 is a table showing an effect expected by air conditioner variable control according to the embodiment of the present disclosure.

DETAILED DESCRIPTION

Figure 1:
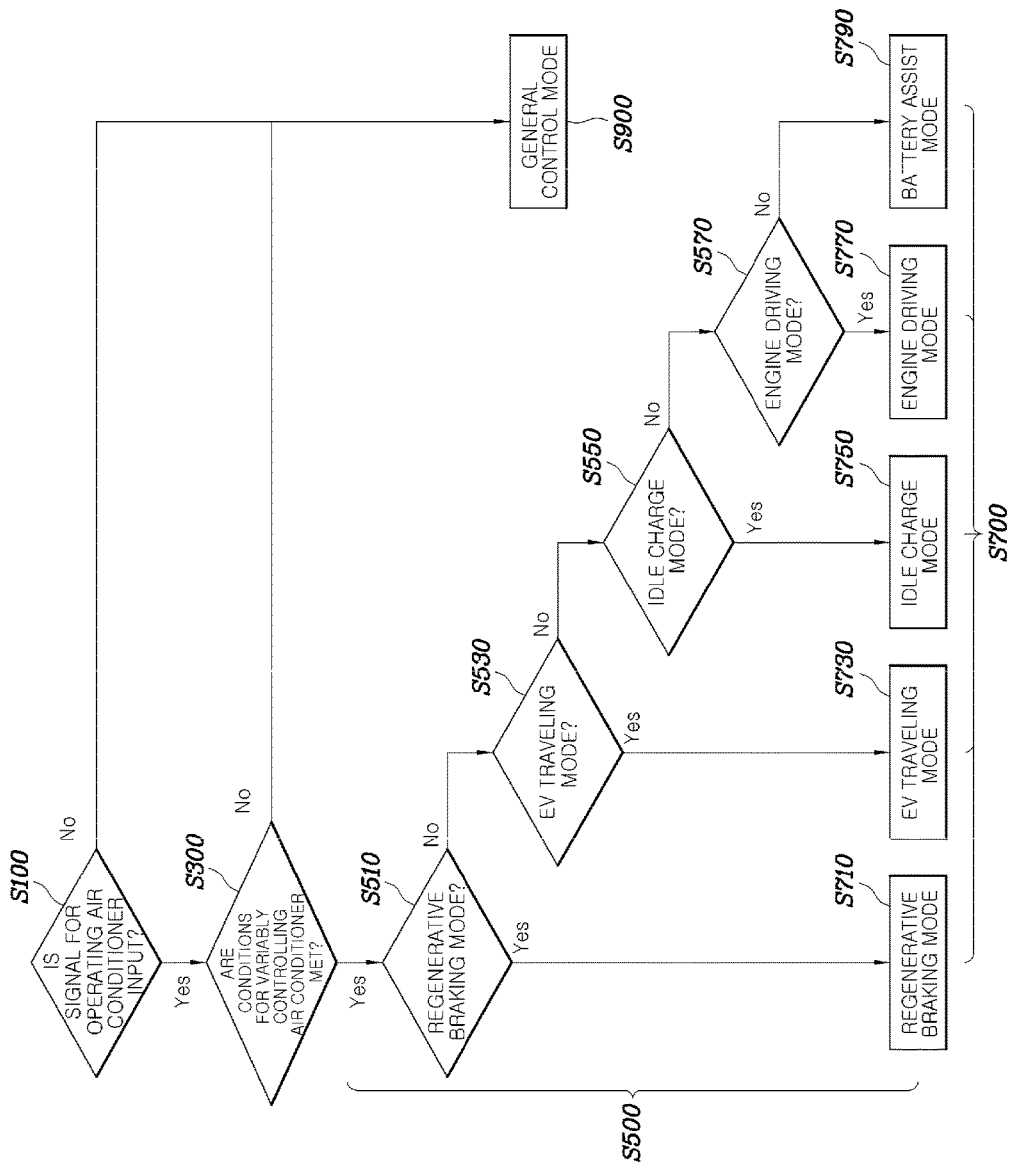
FIG. 1 is a block diagram showing a method of controlling an air conditioner according to an embodiment of the present disclosure.

Hereinbelow, a method of controlling an air conditioner according to an exemplary embodiment of the present disclosure will be described in detail with reference to the accompanying drawings.

FIG. 1 is a block diagram showing a method of controlling an air conditioner according to an embodiment of the present disclosure. FIGS. 2 to 6 show different traveling modes for controlling the air conditioner. In FIGS. 2 to 6, a thin arrow line denotes a little energy flow, and a thick arrow line denotes a large energy flow for easy understanding, respectively. FIG. 7 shows a charged/discharged state of a battery according to each traveling mode.

A method of controlling an air conditioner according to an exemplary embodiment of the present disclosure includes determining whether or not a signal for operating the air conditioner is input to a controller (S100). When it is determined in step S100 that the signal for operating the air conditioner is input to the controller, it is determined whether or not conditions for variably controlling the air conditioner are satisfied (S300). An energy flow mode on the basis of an energy flow between a battery, a motor, an engine, and electric components is checked when it is determined in step S300 that the conditions are satisfied (S500), and the air conditioner is operated in a mode corresponding to the energy flow mode checked in step S500 (S700).

In the case of a hybrid vehicle or an electric vehicle, charge/discharge efficiency of the battery is dependent on a charge/discharge current of the battery, and efficiency of the air conditioner is dependent on a compressor speed of the air conditioner. Therefore, power corresponding to the amount of charge/discharge current of the battery controls the air conditioner.

A hybrid vehicle shown in the drawings will be described according to an exemplary embodiment of the present disclosure. However, the present disclosure may be applied to all vehicles using a battery such as an electric vehicle, a fuel cell vehicle, a mild hybrid vehicle, or a strong hybrid vehicle.

First, it is determined in step S100 whether or not the signal for operating the air conditioner is input to the controller of the vehicle. When the signal for operating the air conditioner is not input to the controller, step S900 of controlling the air conditioner in a general control mode using a general method is performed.

When it is determined in step S100 that the signal for operating the air conditioner is input to the controller, it is determined in step S300 whether or not the conditions for variably controlling the air conditioner are satisfied. The conditions may be set according to conditions of an air conditioner controller, an indoor temperature, an outdoor temperature, and revolutions per minute (RPM) of an air conditioner compressor. When all the conditions are satisfied, step S500 is performed.

More specifically, it is determined in step S300 whether or not the condition of the air conditioner controller of the vehicle corresponds to the previous condition input to the controller. Here, the previous input condition checks that a fuel efficiency priority mode is input. When the fuel efficiency priority mode is input, a traveling mode is a Blue mode. When an Econ mode is selected for the air conditioner controller, an air conditioner variable control is performed. When a target indoor temperature for the air conditioner ranges from 20° C. to 25° C., the condition of the air conditioner controller is satisfied to perform the air conditioner variable control.

Secondly, it is determined in step S300 whether or not the indoor temperature condition of the vehicle corresponds to the previous input condition on the basis of collected indoor information. Here, the previous input condition may refer to a condition in which a deviation between the target indoor temperature and an indoor temperature is less than a preset range, or in which the air conditioner is operated when a predetermined time has elapsed after starting. The previous input condition may be applied in additional consideration of a sensory temperature. When this condition is satisfied, the air conditioner variable control is performed.

Thirdly, it is determined in step S300 whether or not the outdoor temperature condition of the vehicle corresponds to the previous input condition on the basis of collected outdoor information. Here, the previous input condition refers to a solar condition or an outdoor temperature input from a solar sensor. When the temperature input from the sensor corresponds to a preset range, the air conditioner is variably controlled, and a degree of influence is reflected by an expression of "a<outdoor temperature+solar condition*k<b (k=solar influence degree constant)." Such an expression is variable according to the design of the vehicle, the environment, or other conditions. In this expression, k is a specified constant and is previously input to the controller.

Fourthly, it is determined in step S300 whether or not the RPM of the air conditioner compressor corresponds to the previous input condition. Here, the previous input condition refers to a preset minimum or maximum RPM range of the air conditioner compressor. When the air conditioner compressor is operated within the preset range, the air conditioner variable control is performed.

As described above, it is determined in step S300 whether or not the condition of the air conditioner controller, the indoor temperature condition, the outdoor temperature condition, and the RPM of the compressor of the air conditioner correspond to the previous input conditions. When all the conditions are satisfied, step S500 is performed. If any one of the conditions is not satisfied, the controller controls the air conditioner in the general control mode, i.e. with a fixed load regardless of the vehicle condition (S900).

When it is determined in step S300 that all the conditions are satisfied, step S500 of checking the energy flow mode on the basis of the energy flow between the battery, the motor, the engine, and electric components is performed. More specifically, it is determined in step S500 whether or not the energy flow mode is a regenerative braking mode (S510). When the energy flow mode is the regenerative braking mode, the air conditioner is controlled in a method corresponding to the regenerative braking mode previously input to the controller (S710). When the energy flow mode is not the regenerative braking mode, it is checked whether or not the energy flow mode is performed in an electric vehicle (EV) traveling mode (S530). When the energy flow mode is the EV traveling mode, the air conditioner is controlled in a method corresponding to the EV traveling mode previously input to the controller (S730). When the energy flow mode is not the EV traveling mode, it is checked whether or not the energy flow mode is an idle charge mode (S550). When the energy flow mode is the idle charge mode, the air conditioner is controlled in a method corresponding to the charge mode previously input to the controller (S750). When the energy flow mode is not the charge mode, it is checked whether or not the energy flow mode is an engine driving mode (S570). When the energy flow mode is the engine driving mode, the air conditioner is controlled in a method corresponding to the engine driving mode previously input to the controller (S770). When the energy flow mode is not the engine driving mode, the air conditioner is controlled in a method corresponding to a battery assist mode previously input to the controller (S790).

In the case of a hybrid vehicle, an electric energy flow between components, such as the engine, the motor, and the battery, varies depending on the energy flow indicating that the battery is charged or discharged or in which condition the vehicle currently is placed. As such, the energy flow between the components is distinguished, and power required to operate the air conditioner according to the corresponding energy flow mode is supplied to the air conditioner.

Referring to FIGS. 2 to 6, the energy flow mode can be divided into a regenerative braking mode, an EV traveling mode or battery assist mode, a charge mode, an engine driving mode, and a stop mode according to the energy flow between the components.

FIG. 2 shows the regenerative braking mode in which, when braking is applied, a battery through a motor. To determine the regenerative braking mode, regenerative braking power and braking power are compared, or a battery charge current and a battery regenerative current are compared. The regenerative braking mode is referred to when the regenerative braking power is greater, or when the battery charge current is greater. In the regenerative braking mode, since the amount of energy supplied to the battery is greater compared to the other modes, energy from the motor is supplied to the battery and the air conditioner.

Thus, it is determined in step S510 whether or not the energy flow mode is the regenerative braking mode. When the energy flow mode is the regenerative braking mode, the air conditioner is controlled in a method corresponding to the regenerative braking mode previously input to the controller (S710). When the energy flow mode is not the regenerative braking mode, it is checked whether or not the energy flow mode is performed in the EV traveling mode in step S530.

FIG. 3 shows the EV traveling mode or the battery assist mode in which the vehicle travels by driving the motor using the energy of the battery without driving the engine. To determine the EV traveling mode, the engine RPM and the motor RPM are compared, or battery discharge current (or power) and battery assist current are compared. The energy flow mode is determined to be the EV traveling mode when the motor RPM is greater, or when the battery discharge current (or power) is greater. In this case, since most of the energy stored in the battery is used to drive the motor, relatively weak power is supplied to the air conditioner.

Thus, it is determined in step S530 whether or not the energy flow mode is the EV traveling mode. When the energy flow mode is the EV traveling mode, the air conditioner is controlled in a method corresponding to the EV traveling mode previously input to the controller (S730). If the energy flow mode is not the EV traveling mode, it is checked whether or not the energy flow mode is the idle charge mode (S550).

FIG. 4 shows the charge mode in which the energy from the engine or the motor during idling is typically charged to the battery. The energy flow mode is determined to be the idle charge mode when the engine power is greater than motor power, and the EV traveling mode is selected. In the idle charge mode, since the energy introduced from the motor charges the battery, relatively less energy is supplied to the air conditioner compared to the other modes.

Thus, it is determined in step S550 whether or not the energy flow mode is the idle charge mode. When the energy flow mode is the idle charge mode, the air conditioner is controlled by a method corresponding to the charge mode previously input to the controller (S750). If the energy flow mode is not the charge mode, it is checked whether or not the energy flow mode is the engine driving mode (S570).

FIG. 5 shows the engine driving mode in which the engine is driven like the idle charge mode of FIG. 4, but a driving force of the engine regenerates the battery using the motor. The engine driving mode is divided into a motor assist state and a motor regenerative state. To determine the motor assist state, the engine RPM and the motor RPM are compared, or motor discharge power and motor assist power are compared. If the engine RPM is greater or the motor discharge power is greater, the energy flow mode is determined to be the motor assist state. The engine RPM and the motor RPM are compared, or the motor charge power and motor regenerative power are compared to determine the motor regenerative state. If the engine RPM is greater or the motor charge power is greater, the energy flow mode is determined to be the motor regenerative state. In the engine driving mode, since relatively higher energy is introduced from the motor, more energy can be supplied to the air conditioner in comparison with the other modes.

Thus, it is determined in step S570 whether or not the energy flow mode is the engine driving mode. When the energy flow mode is the engine driving mode, the air conditioner is controlled in a method corresponding to the engine driving mode previously input to the controller (S770). When the energy flow mode is not the engine driving mode, referring to FIG. 3, the air conditioner is controlled in a method corresponding to the battery assist mode previously input to the controller (S790).

FIG. 6 shows an energy flow when a vehicle stops (a stop mode). FIG. 7 is a graph showing a charge/discharge state of a battery according to traveling of the vehicle in view of FIGS. 2 to 6. In FIG. 7, the charge/discharge state according to the traveling mode from starting of the vehicle to traveling termination is shown so as to be checked at a glance.

FIG. 8 shows charge/discharge efficiency of the battery, and FIG. 9 is a table showing an effect expected by air conditioner variable control according to an exemplary embodiment of the present disclosure. As shown in FIG. 8, when it is assumed that the charge/discharge efficiency of the battery is 90%, and when a charge/discharge current amount has a difference of 1 A (when a battery voltage is 250 V, and when power of the air conditioner is 250 W), the efficiency is raised by 0.1%. When the power of the air conditioner varies, the temperature of air discharged from the air conditioner and the indoor temperature vary.

Therefore, as the power consumption amount of the air conditioner varies depending on the energy flow of the hybrid vehicle within a temperature variable allowance range of the indoor temperature, the charge/discharge efficiency of the battery varies. As the charge/discharge efficiency of the battery increases, traveling fuel efficiency rises. In addition, when the air conditioner is controlled in view of efficiency according to a compressor speed of the air conditioner and the charge/discharge efficiency of the battery according to a variable amount of the air conditioner, the entire energy of the vehicle is increased, so that the fuel efficiency is increased.

In the present disclosure, the energy flow mode of the hybrid vehicle is divided into the charge and discharge modes according to the energy flow of the hybrid vehicle battery. The charge mode of the battery corresponds to the regenerative braking mode and the engine driving mode as shown in FIGS. 2 and 5, respectively, and the discharge mode of the battery corresponds to the EV traveling mode or the battery assist mode shown in FIG. 3.

When the vehicle is in an idle or stop mode, only a power load or energy for air conditioning is consumed without consuming the battery for traveling. The idle and stop modes are shown in FIGS. 4 and 6, respectively.

To variably control the air conditioner refers to dividing the air conditioner control mode according to the energy flow mode of the vehicle and varying the energy within a deviation allowance range of the indoor temperature so that the charge/discharge energy of the battery is minimized according to the mode. In the charge mode of the battery, the air conditioner is controlled by adding alpha to an existing amount of power required by the air conditioner. In the discharge mode of the battery, the air conditioner is controlled by adding beta (negative number) to an existing amount of power required by the air conditioner. In the stop mode of the vehicle, the air conditioner is controlled by adding gamma to an existing amount of power required by the air conditioner. Here, the alpha, the beta, and the gamma are constants, and may vary depending on design or environment of the vehicle.

Further, in the present disclosure, as the component dissipating the energy of the battery, the air conditioner has been described as an example. However, a component dissipating the energy of the battery may be applied to a positive temperature coefficient (PTC) heater, an auxiliary battery, a low-voltage dc-dc converter (LDC), a flow rate control component such as an electric water pump and so on.

In the method of variably controlling the air conditioner according to an exemplary embodiment of the present disclosure, even when the air conditioner dissipates the same energy, the entire efficiency of the system is increased because the charge/discharge efficiency of the battery is increased, so that the fuel efficiency is improved as shown in FIG. 9. It can be found that the fuel efficiency is increased by 0.17%.

Unlike the related art in which the air conditioner dissipates the same energy, the power of the air conditioner is variably controlled according to the energy flow mode of the vehicle, so that it is possible to improve the fuel efficiency with respect to the gain of the charge/discharge of the battery.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling an air conditioner comprising steps of:
   determining whether or not a signal for operating the air conditioner is input to a controller;
   when it is determined that the signal for operating the air conditioner is input to the controller, determining whether or not conditions for variably controlling the air conditioner are satisfied;
   when it is determined that the conditions are satisfied, checking one of a plurality of energy flow modes on the basis of an energy flow between a battery, a motor, an engine, and electric components;
   controlling the air conditioner to be operated in a mode corresponding to the checked energy flow mode,
   wherein a compressor of the air conditioner is driven by the motor which provide a vehicle with a driving power,
   wherein the controller determines that the checked energy flow mode is a regenerative braking mode when a regenerative braking power is greater than a braking power or when a battery charge current is greater than a battery regenerative current, and upon determining that the checked energy flow mode is the regenerative braking mode, the controller operates the air conditioner and charges the battery by using regenerative energy supplied from the motor, and
   wherein the controller determines that the checked energy flow mode is an idle charge mode when a power of the engine is greater than a power of the motor and when the electric vehicle (EV) traveling mode is selected as a driving mode of the vehicle, and upon determining that the checked energy flow mode is the idle charge mode, the controller supplies the air conditioner with electrical energy less than electrical energy supplied to the air conditioner in any other of the plurality of energy flow modes.

2. The method according to claim 1, further comprising controlling the air conditioner in a general control mode when it is determined that the signal for operating the air conditioner is not input to the controller.

3. The method according to claim 1, wherein the step of determining whether or not the conditions for variably controlling the air conditioner are satisfied includes determining whether or not a condition of an air conditioner controller of the vehicle corresponds to a previous condition input to the controller.

4. The method according to claim 1, wherein the step of determining whether or not the conditions for variably controlling the air conditioner are satisfied includes determining whether or not an indoor temperature condition of the vehicle corresponds to a previous condition input to the controller on the basis of collected indoor information.

5. The method according to claim 1, wherein the determining of whether or not the conditions for variably controlling the air conditioner are satisfied includes determining whether or not an outdoor temperature condition of the vehicle corresponds to a previous condition input to the controller on the basis of collected outdoor information.

6. The method according to claim 1, wherein the step of determining whether or not the conditions for variably controlling the air conditioner are satisfied includes determining whether or not revolutions per minute (RPM) of the compressor of the air conditioner corresponds to a previous condition input to the controller.

7. The method according to claim 1, wherein the step of determining whether or not the conditions for variably controlling the air conditioner are satisfied includes whether or not a condition of an air conditioner controller, an indoor temperature condition, an outdoor temperature condition, and revolutions per minute (RPM) of the compressor of the air conditioner correspond to previous conditions input to the controller and, when all the conditions are satisfied, the step of checking one of the plurality of energy flow modes is performed.

8. The method according to claim 1, wherein the step of checking one of the plurality of energy flow modes includes determining whether or not one of the plurality of energy flow modes is the regenerative braking mode, and when the checked energy flow mode is the regenerative braking mode, the step of controlling the air conditioner to be operated in a method corresponding to the regenerative braking mode previously input to the controller is performed.

9. The method according to claim 1, wherein the step of checking one of the plurality of energy flow modes includes determining whether or not one of the plurality of energy flow modes is the electric vehicle (EV) traveling mode, and when the checked energy flow mode is the EV traveling mode, the step of controlling the air conditioner to be operated in a method corresponding to the EV traveling mode previously input to the controller is performed.

10. The method according to claim 1, wherein the step of checking one of the plurality of energy flow modes includes determining whether or not one of the plurality of energy flow modes is a charge mode, and when the checked energy flow mode is the charge mode, the step of controlling the air conditioner to be operated in a method corresponding to the charge mode previously input to the controller is performed.

11. The method according to claim 1, wherein the step of checking one of the plurality of energy flow modes includes determining whether or not one of the plurality of energy flow modes an engine driving mode, and when the checked energy flow mode is the engine driving mode, the step of controlling the air conditioner to be operated in a method corresponding to the engine driving mode previously input to the controller is performed.

12. The method according to claim 1, wherein the step of checking one of the plurality of energy flow modes includes determining whether or not one of the plurality of energy flow modes is the regenerative braking mode, the electric vehicle (EV) traveling mode, a charge mode, or an engine driving mode, and when the checked energy flow mode does not correspond to any one of the modes, the step of controlling the air conditioner to be operated in a method corresponding to a battery assist mode previously input to the controller is performed.

\* \* \* \* \*